US012158117B2

(12) United States Patent
Araki

(10) Patent No.: US 12,158,117 B2
(45) Date of Patent: Dec. 3, 2024

(54) ENGINE SYSTEM

(71) Applicant: TOYOTA JIDOSHA KABUSHIKI KAISHA, Toyota (JP)

(72) Inventor: Susumu Araki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/514,726

(22) Filed: Nov. 20, 2023

(65) Prior Publication Data

US 2024/0191669 A1 Jun. 13, 2024

(30) Foreign Application Priority Data

Dec. 9, 2022 (JP) ................................ 2022-197104

(51) Int. Cl.
*F02D 41/00* (2006.01)
*F02D 37/02* (2006.01)
*F02D 41/04* (2006.01)
*F02D 41/38* (2006.01)

(52) U.S. Cl.
CPC ........... *F02D 41/042* (2013.01); *F02D 37/02* (2013.01); *F02D 2041/389* (2013.01)

(58) Field of Classification Search
CPC ... F02D 41/042; F02D 37/02; F02D 2041/389
See application file for complete search history.

(56) References Cited

U.S. PATENT DOCUMENTS 5,678,520 A * 10/1997 Hori ........................ G01M 15/11 123/436
7,610,143 B1 * 10/2009 Boesch .................. B60K 6/547 701/112
2009/0292440 A1 * 11/2009 Ichihara .............. F02D 41/1498 123/90.15
2013/0138328 A1 * 5/2013 Shimo ................... F02D 41/403 701/104
2013/0298872 A1 * 11/2013 Kojima .................. F02M 69/00 123/446
2015/0142297 A1 * 5/2015 Kojima ................. F02D 41/062 701/104
2017/0167461 A1 6/2017 Kanno et al.

FOREIGN PATENT DOCUMENTS

JP 2017-106391 A 6/2017

* cited by examiner

*Primary Examiner* — Phutthiwat Wongwian
*Assistant Examiner* — Sherman D Manley
(74) *Attorney, Agent, or Firm* — Finnegan, Henderson, Farabow, Garrett and Dunner, LLP

(57) ABSTRACT

An engine system includes an engine including first and second cylinders, and a control device configured to execute automatic stop of the engine and restart of the engine. The control device includes an acquisition unit configured to acquire a temperature of the engine and a time during the automatic stop of the engine, a fuel cut control unit configured to execute a specific cylinder fuel cut process for stopping supply of fuel to the first cylinder and for supplying fuel to the second cylinder when there is a request to restart the engine, and an injection amount control unit configured to increase a fuel injection amount in the second cylinder as the time during the automatic stop of the engine is longer and as the temperature of the engine is lower, during execution of the specific cylinder fuel cut process.

4 Claims, 4 Drawing Sheets

ENGINE SYSTEM

CROSS-REFERENCE TO RELATED APPLICATION

This application is based upon and claims the benefit of priority of the prior Japanese Patent Application No. 2022-197104, filed on Dec. 9, 2022, the entire contents of which are incorporated herein by reference.

TECHNICAL FIELD

The present disclosure relates to an engine system.

BACKGROUND

It is known that when an automatically stopped engine is restarted, fuel cut is executed for a specific cylinder among cylinders of the engine and fuel is supplied to the other cylinders (see, for example, Japanese Unexamined Patent Application Publication No. 2017-106391).

When the engine is restarted in this manner, the combustion state in the cylinder to which fuel is supplied might become unstable and the emission might deteriorate.

SUMMARY

It is therefore an object of the present disclosure to provide an engine system that stabilizes the combustion state when the engine is restarted and improves emission.

The above object is achieved by an engine system including: an engine including first and second cylinders; and a control device configured to execute automatic stop of the engine and restart of the engine, wherein the control device includes: an acquisition unit configured to acquire a temperature of the engine and a time during the automatic stop of the engine; a fuel cut control unit configured to execute a specific cylinder fuel cut process for stopping supply of fuel to the first cylinder and for supplying fuel to the second cylinder when there is a request to restart the engine; and an injection amount control unit configured to increase a fuel injection amount in the second cylinder as the time during the automatic stop of the engine is longer and as the temperature of the engine is lower, during execution of the specific cylinder fuel cut process.

The injection amount control unit may be configured to calculate an increase amount of the fuel injection amount in the second cylinder by use of a correction coefficient related to non-contributing fuel that does not contribute to combustion.

The injection amount control unit may be configured to calculate an increase amount of the fuel injection amount in the second cylinder by use of a correction coefficient for suppressing an emission amount of NOx.

The control device may include: an ignition timing control unit configured to control an ignition timing of the engine; and a throttle opening degree control unit configured to control a throttle opening degree of the engine, the ignition timing control unit may be configured to control the ignition timing in the second cylinder in accordance with a fluctuation amount per unit time of at least one of rotational speed and torque of the engine, during execution of the specific cylinder fuel cut process, and the throttle opening degree control unit may be configured to control the throttle opening degree in accordance with the ignition timing of the engine, during execution of the specific cylinder fuel cut process.

The engine system may further include a motor configured to assist torque of the engine during execution of the specific cylinder fuel cut process.

DETAILED DESCRIPTION

Schematic Configuration of Engine System

Figure 1:
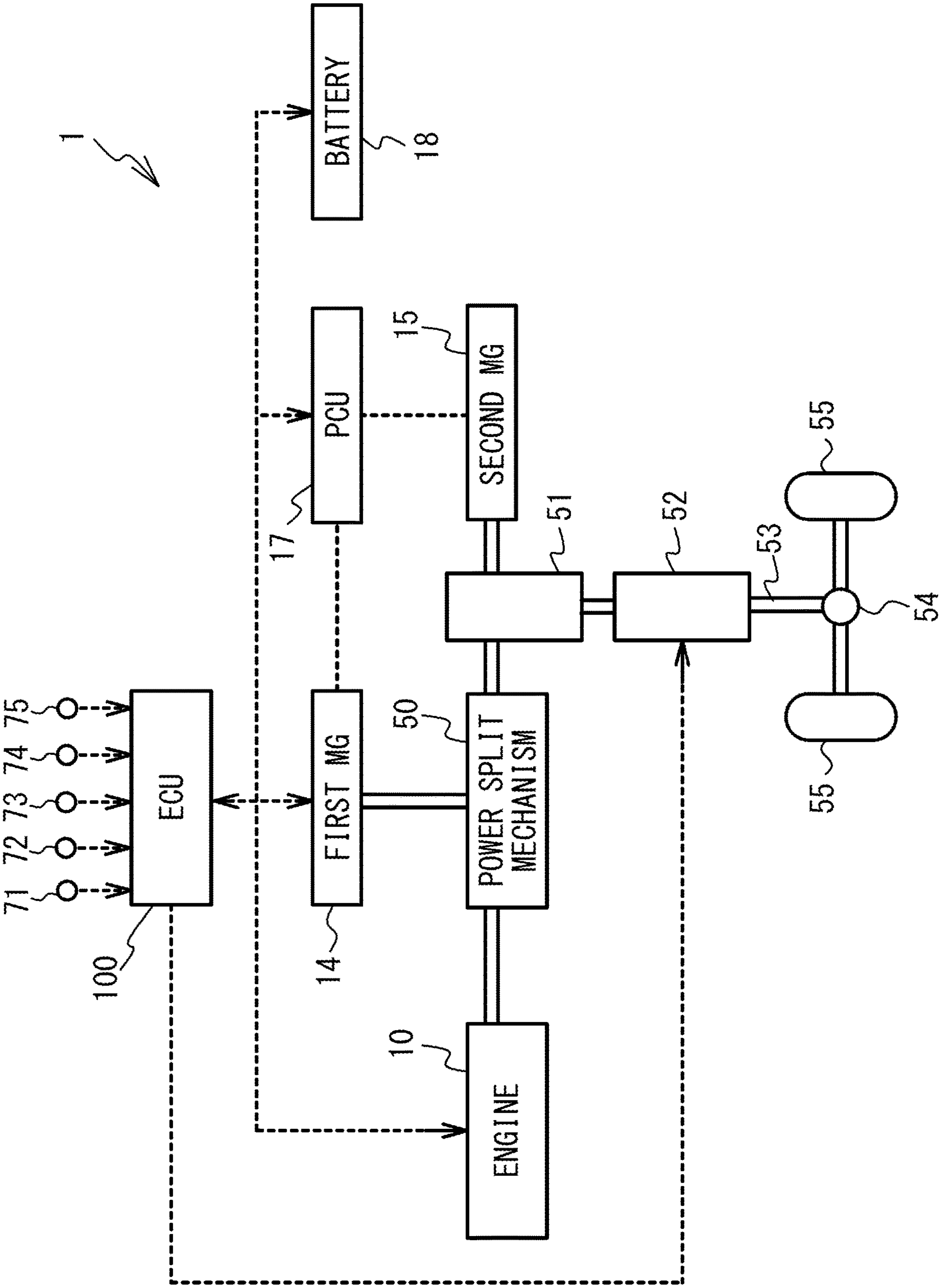
FIG. 1 is a schematic configuration view of an engine system.

FIG. 1 is a schematic configuration view of an engine system 1 according to the present embodiment. In the present embodiment, the engine system 1 is mounted on a hybrid vehicle. The engine system 1 includes an Electronic Control Unit (ECU) 100, an engine 10, a first motor generator (hereinafter referred to as "first MG") 14, a second motor generator (hereinafter referred to as "second MG") 15, a Power Control Unit (PCU) 17, a battery 18, a power split mechanism 50, a transmitting mechanism 51, a transmission 52, a drive shaft 53, a differential gear 54, and drive wheels 55. The engine 10 has four cylinders #1 to #4 in the present embodiment. The number of cylinders is not limited to four as long as the engine 10 has a plurality of cylinders. The engine 10 is a gasoline engine, but is not limited to this and may be a diesel engine. The engine 10, the first MG 14, and the second MG 15 are power sources for traveling of the engine system 1.

The first MG 14 and the second MG 15 have a function as a motor that outputs torque by power supply. Also, the first MG 14 and the second MG 15 have a function as power generators that generate regenerative power when torque is applied thereto. The first MG 14 and the second MG 15 are electrically connected to the battery 18 via the PCU 17. The PCU 17 supplies power from the battery 18 to the first MG 14 or the second MG 15. The PCU 17 causes the battery 18 to receive regenerative electric power generated in the first MG 14 or the second MG 15.

The power split mechanism 50 mechanically couples a crankshaft of the engine 10, a rotational shaft of the first MG 14, and the power split mechanism 50. An output shaft of the power split mechanism 50 is coupled to the transmitting mechanism 51. A rotational shaft of the second MG 15 is coupled to the transmitting mechanism 51. The transmitting mechanism 51 is coupled to the transmission 52. The transmission 52 is coupled to the drive shaft 53. The driving forces of the engine 10, the first MG 14, and the second MG 15 are transmitted to the drive wheels 55 via the transmitting mechanism 51, the transmission 52, the drive shaft 53, and the differential gear 54.

The transmission 52 is a stepped automatic shifting device provided between the second MG 15 and the drive shaft 53. The transmission 52 changes the gear ratio by controlling the ECU 100.

The ECU 100 is an electronic control unit that includes an arithmetic process circuit that executes various types of arithmetic processes related to travel control of the vehicles and a memory that stores control programs and date. The ECU 100 is an example of a control device. The ECU 100 functionally achieves an acquisition unit, a fuel cut control unit, an injection amount control unit, an ignition timing control unit, and a throttle opening degree control unit, which will be described later.

Signals from an ignition switch 71, a water temperature sensor 72, a crank angle sensor 73, an air flow meter 74, and an accelerator opening degree sensor 75 are input to the ECU 100. The ignition switch 71 detects the ON/OFF state of the ignition. The water temperature sensor 72 detects a temperature of a coolant of the engine 10. The crank angle sensor 73 detects an engine rotational speed that is a rotational speed of the crankshaft of the engine 10. The air flow meter 74 detects an amount of intake air introduced into the engine 10. The accelerator opening degree sensor 75 detects an operation position of an accelerator pedal.

Schematic Configuration of Engine

Figure 2:
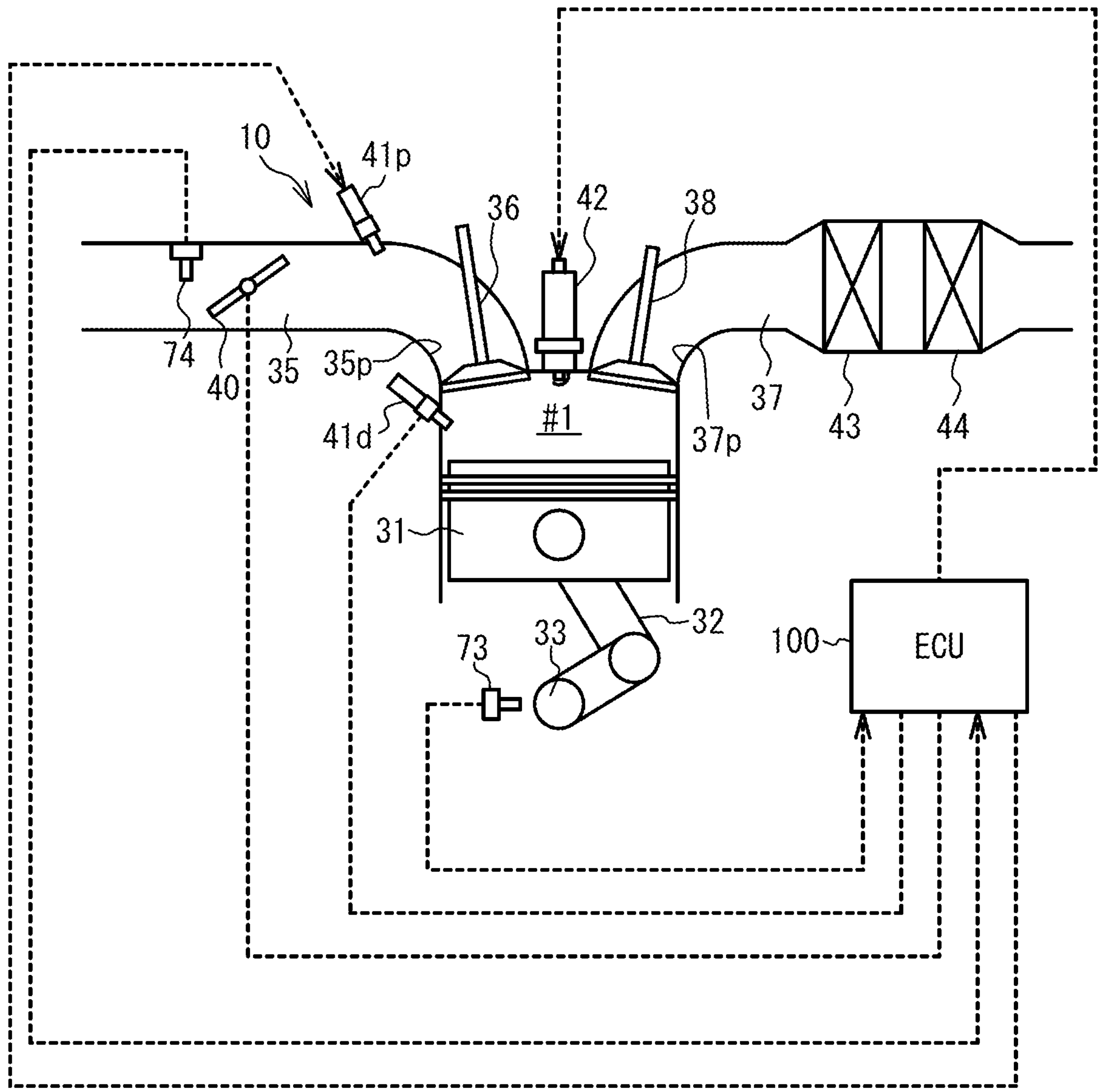
FIG. 2 is a schematic configuration view of an engine.

FIG. 2 is a schematic configuration view of the engine 10. The engine 10 includes a cylinder #1, a piston 31, a connecting rod 32, a crankshaft 33, an intake passage 35, an intake valve 36, an exhaust passage 37, and an exhaust valve 38. FIG. 2 illustrates cylinder #1 among the four cylinders #1 to #4 included in the engine 10. Since the cylinders #1 to #4 have the same configuration, the cylinder #1 will be described below. In the cylinder #1, the air-fuel mixture is burned. The piston 31 is accommodated in the cylinder #1 so as to be capable of reciprocating. The piston 31 is coupled to the crankshaft 33, which is an output shaft of the engine 10, via the connecting rod 32. The connecting rod 32 and the crankshaft 33 convert the reciprocating motion of the piston 31 into rotational motion of the crankshaft 33.

The cylinder #1 is provided with an in-cylinder injector 41*d*. The in-cylinder injector 41*d* directly injects fuel into the cylinder #1. The intake passage 35 is provided with a port injector 41*p* that injects fuel toward an intake port 35*p*. The cylinder #1 is provided with an ignition device 42. The ignition device 42 ignites a mixture of the intake air introduced through the intake passage 35 and the fuel injected by the in-cylinder injector 41*d* and the port injector 41*p*, by spark discharge. Note that at least one of the in-cylinder injector 41*d* and the port injector 41*p* may be provided.

The intake passage 35 is connected to the intake ports 35*p* of the cylinder #1 through the intake valve 36. The exhaust passage 37 is connected to an exhaust port 37*p* of the first cylinder via the exhaust valve 38. The air flow meter 74 described above and a throttle valve 40 that controls the intake air amount are provided in the intake passage 35.

A catalyst 43 and a Gasoline Particulate Filter (GPF) 44 are provided in the exhaust passage 37 from the upstream side. The catalyst 43 contains, for example, a catalytic metal such as platinum (Pt), palladium (Pd), or rhodium (Rh), has oxygen storage capacity, and purifies NOx, HC, and CO. The GPF44 is a porous-ceramic structure and collects exhaust particulates (hereinafter referred to as PM (Particulate Matter)) in exhaust gas.

The throttle valve 40 increases or decreases the amount of intake air introduced into the cylinder #1 by increasing or decreasing an opening degree of the throttle valve 40. The opening degree of the throttle valve 40 is controlled in accordance with a required opening degree from the ECU 100.

Intermittent Operation Control

Figure 3:
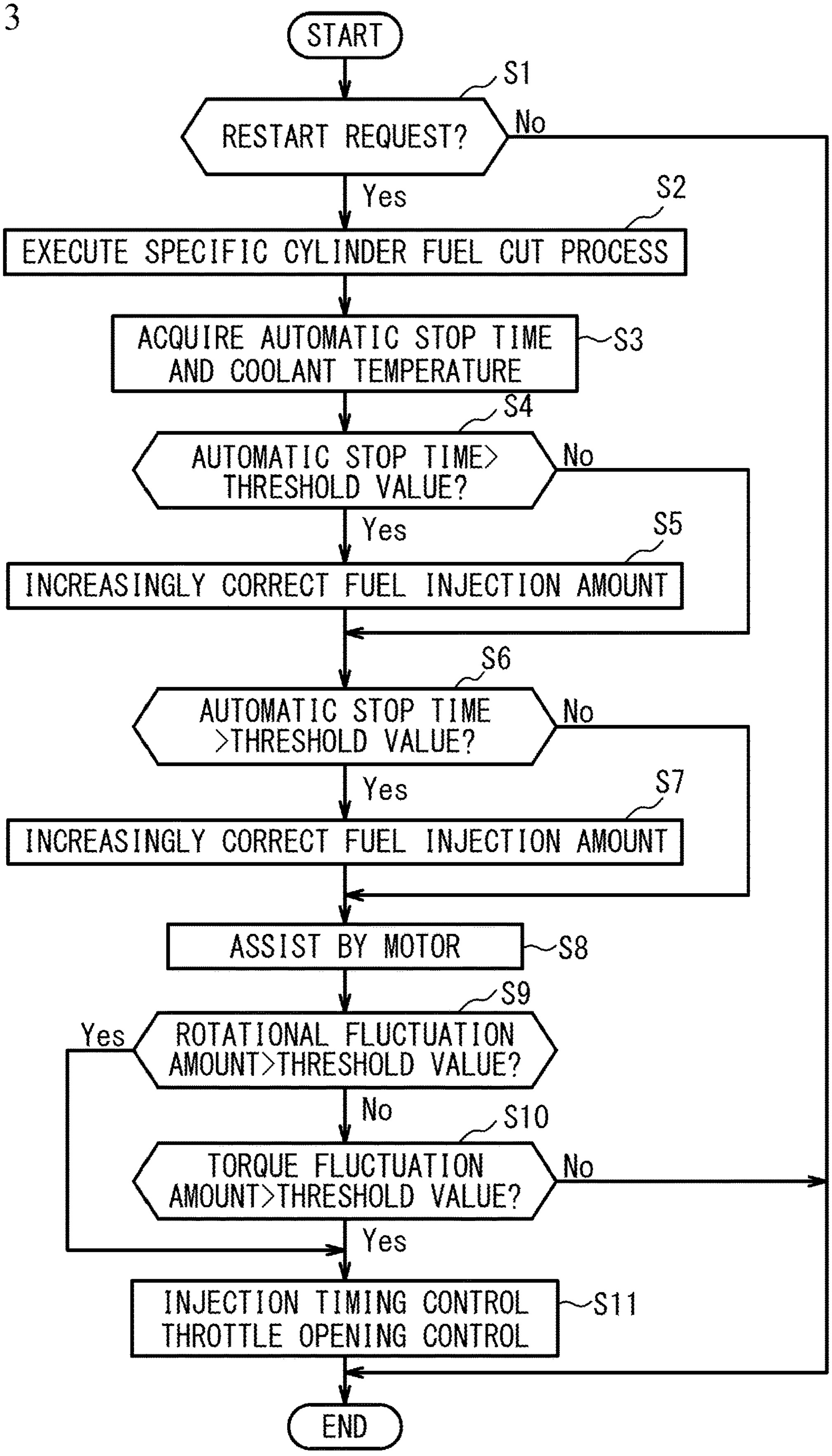
FIG. 3 is a flowchart illustrating an example of intermittent operation control executed by an ECU.

FIG. 3 is a flowchart illustrating intermittent operation control executed by the ECU 100. This control is repeatedly executed at predetermined intervals in a state where the ignition is on. The ECU 100 determines whether or not there is a request for restarting the engine 10 (step S1). In a case of No in step S1, this control ends.

In a case of Yes in step S1, the ECU 100 executes the specific cylinder fuel cut process (step S2). The specific cylinder fuel cut process is a process of stopping the supply of fuel to any one of the cylinders #1 to #4 and supplying fuel to the other cylinders. In the present embodiment, the supply of fuel to the cylinder #1 is stopped, and fuel is supplied to the cylinders #2 to #4. Since the supply of fuel to the specific cylinder is stopped in this way, fuel consumption and emission are improved. During execution of the specific cylinder fuel cut process, feedback control for controlling the fuel injection amount and the intake air amount based on the air-fuel ratio of the exhaust gas is stopped. Step S2 is an example of a process executed by the fuel cut control unit. The cylinder #1 is an example of a first cylinder. The cylinder #2 is an example of a second cylinder.

Next, the ECU 100 acquires an automatic stop time, which is a time during which the engine 10 is automatically stopped, and the temperature of the coolant of the engine 10 (step S3). The automatic stop time is a time from when the engine 10 is automatically stopped to when the engine 10 is restarted. The ECU 100 measures a time from when the engine 10 is automatically stopped to when the engine 10 is restarted. The ECU 100 acquires the temperature of the coolant of the engine 10 based on the detection value of the water temperature sensor 72. Step S3 is an example of a process executed by an acquisition unit.

Next, the ECU 100 determines whether or not the automatic stop time is longer than a threshold value (step S4). In a case of Yes in step S4, the ECU 100 performs correction to increase each fuel injection amount in the cylinders #2 to #4 which are not targets of the fuel cut (step S5). This correction is a correction for increasing the basic fuel injection amount so as to compensate for the non-contributing fuel that adheres to the cylinder inner surface and the top surface of the piston 31 and does not contribute to combustion. The longer the automatic stop time, the more the vaporization of the fuel adhering to the bore wall surface in the cylinder progresses. Therefore, at the time of restart, a part of the injected fuel may adhere to the inner wall surface of the cylinder or the like, and the non-contributing fuel may increase. As a result, the combustion state may become unstable. Therefore, the threshold value of the step S4 is set to the shortest automatic stop time during which the combustion state becomes unstable at the time of restart. Therefore, as the automatic stop time is longer than the threshold value, the fuel injection amount at the time of restart is increased. Specifically, the ECU 100 makes a correction to increase the fuel injection amount with reference to a map illustrated in FIG. 4A. Step S5 is an example of a process executed by the injection amount control unit.

Figure 4A:
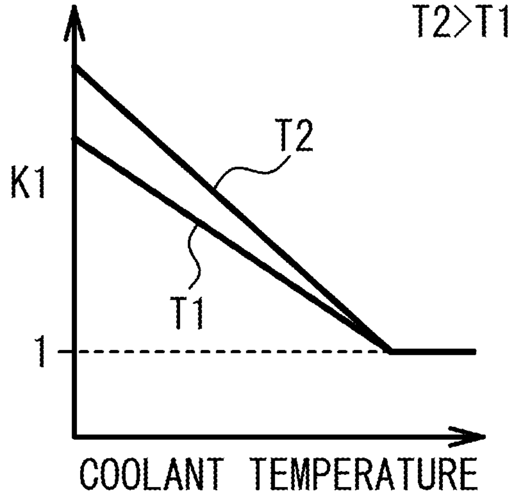
FIG. 4A is an example of a map that defines a correction coefficient K1 for increasing the fuel injection amount by the non-contributing fuel amount.

FIG. 4A is an example of a map that defines a correction coefficient K1 for increasing the fuel injection amount by the non-contributing fuel amount. The correction coefficient K1 is a correction coefficient for increasing the basic fuel injection amount so as to compensate for the non-contributing fuel amount. As illustrated in FIG. 4A, the correction coefficient K1 is defined to be a larger value as the temperature of the coolant is lower. In addition, a case of the automatic stop time T1 and a case of the automatic stop time T2 that is longer than the automatic stop time T1 are illustrated in FIG. 4A. The correction coefficient K1 is set to a larger value in the automatic stop time T2 than in the automatic stop time T1. The correction coefficient K1 is a value greater than or equal to 1 and less than 2. A target injection amount is calculated by multiplying the basic injection amount by the correction coefficient K1 calculated in this way. The ECU 100 controls a valve-opening time of at least one of the in-cylinder injector 41*d* and the port injector 41*p* so that the fuel injection amount becomes the target injection amount. By increasing the fuel injection amount in this way, the combustion state of the engine 10 is stabilized.

In a case of No in step S4, or after step S5, the ECU 100 determines whether or not the automatic stop time is longer than the threshold value (step S6). In a case of Yes in step S6, the correction is executed to increase each fuel injection amount in the cylinders #2 to #4 that are not targets of fuel cut (step S7). This correction is a correction for increasing the basic fuel injection amount so as to suppress an increase in a discharge amount of NOx at the time of restart. The longer the automatic stop time is, the larger the oxygen storage amount of the catalyst 43 is. When exhaust gas having an air-fuel ratio with a high oxygen concentration flows into the catalyst 43 having a large oxygen storage amount in this way, the NOx purification ability of the catalyst 43 decreases. Therefore, the threshold value in step S6 is set to the shortest automatic stop time during which the NOx purifying capability of the catalyst 43 is lowered at the time of restarting the engine. The threshold value in step S6 may be the same as or different from the threshold value in step S4. Specifically, the ECU 100 makes a correction to increase the fuel injection amount with reference to a map illustrated in FIG. 4B. Step S7 is an example of a process executed by the injection amount control unit.

Figure 4B:
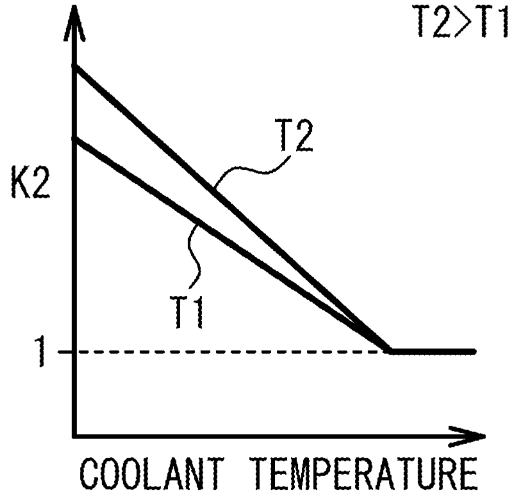
FIG. 4B is an exemplary view of a map that defines a correction coefficient K2 for increasing the amount of fuel required to suppress the amount of NOx emission.

FIG. 4B is an exemplary view of a map that defines a correction coefficient K2 for increasing the amount of fuel required to suppress the amount of NOx emission. The correction coefficient K2 is a correction coefficient for increasing the basic fuel injection amount so as to suppress the discharge amount of NOx. As illustrated in FIG. 4B, the correction coefficient K2 is defined to be a larger value as the temperature of the coolant is lower. Further, the correction coefficient K2 is set to a larger value in the automatic stop time T1 than in the automatic stop time T2. The correction coefficient K2 is a value greater than or equal to 1 and less than 2, for example. For example, when the correction coefficient K1 and the correction coefficient K2 described above are calculated, the target injection amount is calculated by multiplying the basic injection amount by a value. This value is obtained by adding the correction coefficient K1 to the correction coefficient K2 and subtracting 1 from the result. When only the correction coefficient K2 is calculated, the target injection amount is calculated by multiplying the basic injection amount by the correction coefficient K2. By increasing the fuel injection amount in this way, the emission at the time of restarting the engine 10 is improved.

Next, the ECU 100 assists the torque of the engine 10 associated with the execution of the specific cylinder fuel cut process by the first MG 14 (step S8). The torque of the engine 10 temporarily decreases in a period corresponding to the explosion stroke of the cylinder in which the fuel cut is executed. The torque of the first MG 14 is controlled so as to compensate for such a decrease in the torque of the engine 10. For example, the ECU 100 recognizes the explosion stroke of the cylinders in which the fuel cut is executed based on the detection value of the crank angle sensor 73. The ECU 100 controls the first MG 14 such that the torque of the PCU 17 temporarily increases during this power stroke. Thus, drivability is ensured.

Next, the ECU 100 determines whether or not a fluctuation amount of the rotational speed of the engine 10 per unit time is larger than a threshold value (step S9). The rotational speed of the engine 10 is calculated based on the detection value of the crank angle sensor 73. The threshold value in this case is set to, for example, an upper limit value of the fluctuation amount of the rotational speed of the engine 10 that does not affect drivability. When the determination result in step S9 is No, the ECU 100 determines whether or not the fluctuation amount of the torque of the engine 10 per unit time is larger than a threshold value (step S10). The threshold value in this case is also set to, for example, an upper limit value of the fluctuation amount of the torque of the engine 10 that does not affect drivability. The torque of the engine 10 may be calculated based on, for example, a current value supplied to the first MG 14 connected to the engine 10 and the rotational speed of the engine 10. The torque of the engine 10 may be calculated from various state quantities such as the rotational speed of the engine 10 and the opening degree of the throttle valve 40. In a case of No in step S10, this control ends.

In a case of Yes in step S9 or S10, the ECU 100 controls the ignition timing and the throttle opening (step S11). Specifically, the ECU 100 retards the ignition timing more than a case of No in the steps S9 and S10. The ECU 100 retards the ignition timing as the temperature of the coolant decreases. As a result, the combustion state of the engine 10 is stabilized and the torque of the engine 10 is increased. The ECU 100 controls the throttle opening degree in accordance with the ignition timing controlled in this way. Specifically, the ECU 100 decreases the throttle opening degree more than a case of No in steps S9 and S10. As a result, the intake air amount is reduced, and the fuel injection amount is correspondingly reduced. Therefore, the fuel consumption is improved. As described above, the fuel efficiency is improved while suppressing fluctuations in the rotational speed and the torque of the engine 10. Step S11 is an example of a process executed by the ignition timing control unit and the throttle opening degree control unit.

Note that only one of steps S9 and S10 may be executed. The contents of the present embodiment may be applied to an engine system of an engine vehicle on which only an engine is mounted as a traveling power source.

Although some embodiments of the present disclosure have been described in detail, the present disclosure is not limited to the specific embodiments but may be varied or changed within the scope of the present disclosure as claimed.

What is claimed is:

1. An engine system comprising:

an engine including first and second cylinders; and a control device configured to execute automatic stop of the engine and restart of the engine, wherein the control device includes:

an acquisition unit configured to acquire a temperature of the engine and a time during the automatic stop of the engine;

a fuel cut control unit configured to execute a specific cylinder fuel cut process for stopping supply of fuel to the first cylinder and for supplying fuel to the second cylinder when there is a request to restart the engine; and an injection amount control unit configured to increase a fuel injection amount in the second cylinder as the time during the automatic stop of the engine is longer and as the temperature of the engine is lower, during execution of the specific cylinder fuel cut process, and the injection amount control unit is configured to calculate an increase amount of the fuel injection amount in the second cylinder by use of a correction coefficient for suppressing an emission amount of NOx.

2. The engine system according to claim 1, wherein the injection amount control unit is configured to calculate the increase amount of the fuel injection amount in the second cylinder by use of a non-contributing-fuel-correction coefficient related to non-contributing fuel that does not contribute to combustion.

3. The engine system according to claim 1, wherein the control device includes:

an ignition timing control unit configured to control an ignition timing of the engine; and a throttle opening degree control unit configured to control a throttle opening degree of the engine, the ignition timing control unit is configured to control the ignition timing in the second cylinder in accordance with a fluctuation amount per unit time of at least one of rotational speed and torque of the engine, during execution of the specific cylinder fuel cut process, and the throttle opening degree control unit is configured to control the throttle opening degree in accordance with the ignition timing of the engine, during execution of the specific cylinder fuel cut process.

4. The engine system according to claim 1, further comprising a motor configured to assist torque of the engine during execution of the specific cylinder fuel cut process.

* * * * *